(12) United States Patent
Aoki et al.

(10) Patent No.: US 6,441,661 B1
(45) Date of Patent: Aug. 27, 2002

(54) PLL CIRCUIT

(75) Inventors: Hiroshi Aoki, Yokohama (JP); Shiro Suzuki, Abiko (JP); Junichi Horigome, Tokyo (JP); Takayoshi Chiba, Machida (JP); Shigeo Yamaguchi, Kawasaki (JP)

(73) Assignees: Asahi Kasei Kabushiki Kaisha, Osaka (JP); Asahi Kasei Microsystems Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/720,658
(22) PCT Filed: Jun. 30, 1999
(86) PCT No.: PCT/JP99/03526
   § 371 (c)(1),
   (2), (4) Date: Dec. 28, 2000
(87) PCT Pub. No.: WO00/00975
   PCT Pub. Date: Jan. 6, 2000

(30) Foreign Application Priority Data

Jun. 30, 1998 (JP) ............................................. 10/184451

(51) Int. Cl.[7] ................................................. H03L 7/06
(52) U.S. Cl. ....................................... 327/159; 327/150
(58) Field of Search ............................... 327/156, 141, 327/147, 150, 159

(56) References Cited

U.S. PATENT DOCUMENTS

| | | | | |
|---|---|---|---|---|
| 4,906,941 A | | 3/1990 | Kato et al. | 328/153 |
| 5,805,024 A | * | 9/1998 | Takashi et al. | 331/17 |
| 6,087,869 A | * | 7/2000 | Ohishi et al. | 327/156 |
| 6,226,139 B1 | * | 5/2001 | Yada et al. | 360/51 |

FOREIGN PATENT DOCUMENTS

| | | |
|---|---|---|
| JP | 1-296733 | 11/1989 |
| JP | 3-26113 | 2/1991 |
| JP | 7-65508 | 3/1995 |

* cited by examiner

*Primary Examiner*—Kenneth B. Wells
*Assistant Examiner*—Cassandra Cox
(74) *Attorney, Agent, or Firm*—Finnegan, Henderson, Farabow, Garrett & Dunner, L.L.P.

(57) ABSTRACT

An A/D converter (30) samples an analog signal synchronously with a sampling clock from a VCO (70). These sampled values are stored in a shift register (410). A code judging section (420) detects the positive/negative sign pattern (time-series code pattern) of the sampled values held in storage elements (S0 to S5) of the shift register (410) and stores the sampled values in predetermined register (431 to 434) according to the detected sign pattern. According to this, a calculating section (430) determines the phase difference between the analog signal and the sampling clock. The phase difference is fed to a VCO (70) through a D/A converter (50) and a loop filter (60).

14 Claims, 12 Drawing Sheets

FIG. 2

| | S5 S4 S3 S2 S1 S0 | PROCESSING CONTENTS |
|---|---|---|
| | * * + + + + | — |
| | * * − − − − | — |
| A3 | + + − + + + | S2→Smpl−(−+) S1→Smpl+(−+) |
| | − + − + + + | — |
| | * − − + + + | — |
| | * + + − − − | — |
| | + − + − − − | — |
| A4 | − − + − − − | S2→Smpl+(+−) S1→Smpl−(+−) |
| A1 | * + + − + + | S1→Smpl−(−+) S0→Smpl+(−+) |
| B3 | * − + − + + | — |
| B4 | * + − + − − | — |
| A2 | * − − + − − | S1→Smpl+(+−) S0→Smpl−(+−) |
| | * * − − + + | S2→Smpl−(−+) S1→Smpl+(−+) |
| | * * + + − − | S2→Smpl+(+−) S1→Smpl−(+−) |
| A5 | * * + + − + | S2→Smpl+(+−) S1→Smpl−(+−) |
| A6 | * * − − + − | S2→Smpl−(−+) S1→Smpl+(−+) |
| B2 | * * − + − + | — |
| B1 | * * + − + − | — |
| | * + + − − + | S1→Smpl−(−+) S0→Smpl+(−+) |
| | + − + − − + | S1→Smpl−(−+) S0→Smpl+(−+) |
| | − − + − − + | S1→Smpl−(−+) S0→Smpl+(−+) |
| | + + − + + − | S1→Smpl+(+−) S0→Smpl−(+−) |
| | − + − + + − | S1→Smpl+(+−) S0→Smpl−(+−) |
| | * − − + + − | S1→Smpl+(+−) S0→Smpl−(+−) |
| | * * − − − + | S1→Smpl−(−+) S0→Smpl+(−+) |
| D1 | * * + + + − | S1→Smpl+(+−) S0→Smpl−(+−) |

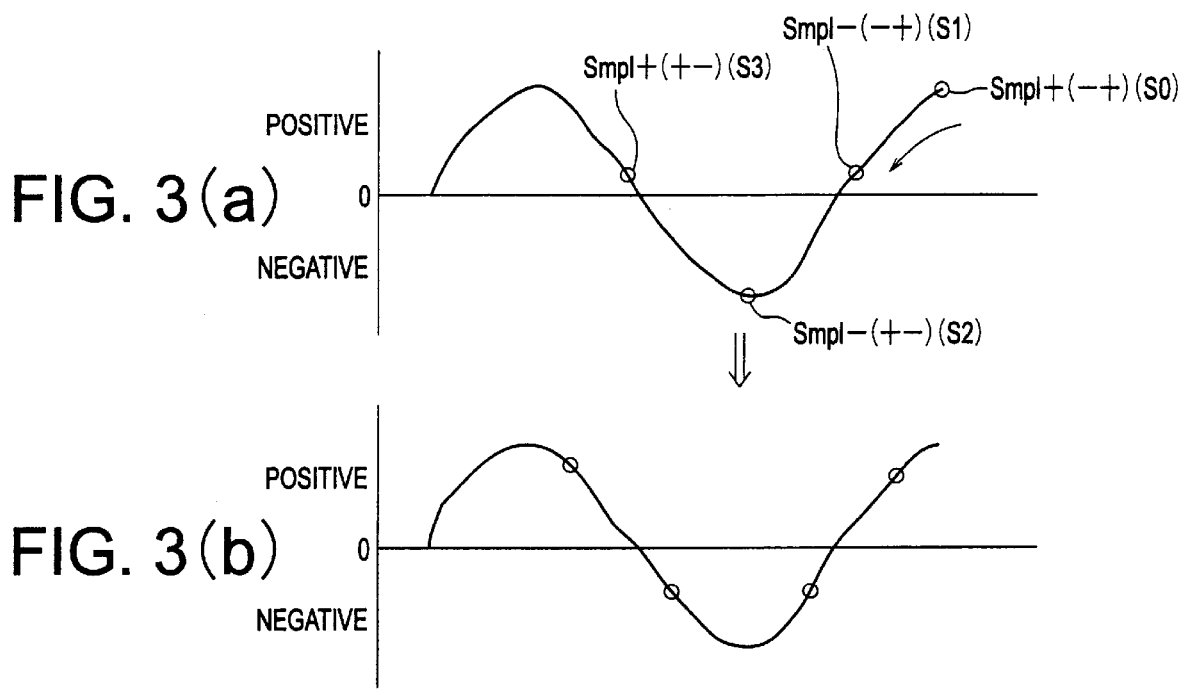
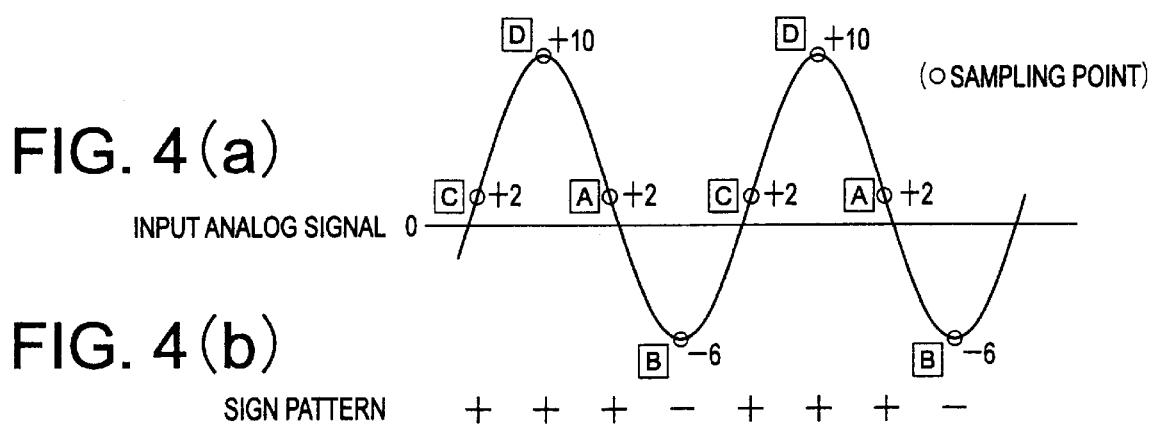

FIG. 7

| State | S3 S2 S1 S0 | PROCESSING | |
|---|---|---|---|
| | | OUTPUT TO CALCULATING REGISTER | STATE TRANSITION |
| Valid | + − + + | S1→Smpl−(−+) S0→Smpl+(−+) | Valid |
| Valid | − + − − | S1→Smpl+(+−) S0→Smpl−(+−) | Valid |
| Valid | + − + − | − | Cancel |
| Valid | − + − + | − | Cancel |
| Valid | − − + − | S2→Smpl−(−+) S1→Smpl+(−+) | Unknown |
| Valid | + + − + | S2→Smpl+(+−) S1→Smpl−(+−) | Unknown |
| Valid | − − + + | S2→Smpl−(−+) S1→Smpl+(−+) | Valid |
| Valid | + + − − | S2→Smpl+(+−) S1→Smpl−(+−) | Valid |
| Valid | − − − + | S1→Smpl−(−+) S0→Smpl+(−+) | Valid |
| Valid | + + + − | S1→Smpl+(+−) S0→Smpl−(+−) | Valid |
| Valid | + − − + | S1→Smpl−(−+) S0→Smpl+(−+) | Valid |
| Valid | − + + − | S1→Smpl+(+−) S0→Smpl−(+−) | Valid |
| Valid | + + + + | − | Valid |
| Valid | − − − − | − | Valid |
| Valid | − + + + | − | Valid |
| Valid | + − − − | − | Valid |
| Unknown | − + + + | S2→Smpl−(−+) S1→Smpl+(−+) | Valid |
| Unknown | + − − − | S2→Smpl+(+−) S1→Smpl−(+−) | Valid |
| Unknown | − + − − | − | Valid |
| Unknown | + − + + | − | Valid |
| Unknown | − + + − | S1→Smpl+(+−) S0→Smpl+(+−) | Valid |
| Unknown | + − − + | S1→Smpl−(−+) S0→Smpl+(−+) | Valid |
| Unknown | − + − + | − | Cancel |
| Unknown | + − + − | − | Cancel |
| Cancel | − + + + | − | Valid |
| Cancel | + − − − | − | Valid |
| Cancel | − + − − | − | Valid |
| Cancel | + − + + | − | Valid |
| Cancel | − + + − | S1→Smpl+(+−) S0→Smpl+(+−) | Valid |
| Cancel | + − − + | S1→Smpl−(−+) S0→Smpl+(−+) | Valid |
| Cancel | + − + − | − | Cancel |
| Cancel | − + − + | − | Cancel |

(○ SAMPLING POINT)

PLL CIRCUIT

TECHNICAL FIELD

The present invention relates to a PLL (Phase-Locked Loop) circuit, and in particular, to a PLL circuit that can reduce the number of false locks than a conventional PLL circuit for a signal that is read from a storage medium such as an MO disk (Magneto-Optical disk), a CD (Compact Disk), an MD (Mini Disk), and HD (Hard Disk), and further can perform locking (synchronizing) operation faster than before.

BACKGROUND ART

A decoding apparatus configured by including a conventional PLL circuit will be described with reference to FIG. 10.

This decoding apparatus comprises a gain controller 10 receiving a read signal from an MO, a CD, an MD, an HD, or the like as an input signal and performing desired amplifying operation for this input signal, an equalizing filter 20 filtering an output of this gain controller 10,. a PLL circuit 100, and a Viterbi decoding circuit 80 outputting a Viterbi decoding result.

The PLL circuit 100, as shown in FIG. 10, comprises an A/D converter 30 performing the A/D conversion of an output of the equalizing filter 20, a phase difference calculating unit 40 obtaining phase difference on the basis of an output from this A/D converter 30, a D/A converter 50 for performing the D/A conversion of this phase difference and outputting it, a loop filter 60 for integrating an output of the D/A converter 50, and a VCO (Voltage Controlled Oscillator) 70 for generating a sampling clock according to an integrated signal.

Each component of this PLL circuit 100 configures a PLL loop as a whole, and by this PLL loop, phase pulling-in operation is performed so that phase difference obtained in the phase difference calculating unit 40 becomes "zero". In addition, the sampling operation of the A/D converter 30 is performed with synchronizing with the sampling clock from the VCO 70.

Next, the operation of the PLL circuit 100 having such configuration will be described with reference to drawings.

When an analog signal shown in FIG. 11(a) is given, the A/D converter 30 generates sampled values by sampling the analog signal as well as synchronizing with the rise of the sampling clock from VCO 70 that is shown in FIG. 11(b), and outputs this sampled values. A round mark in FIG. 11(a) shows a sampling point, and its numeric value shows a concrete sampled value. The phase difference calculating unit 40 obtains phase difference between the above-described input analog signal and sampling clock from the next formula (1) on the basis of four sampled values obtained as described above.

Phase difference={Smpl+(−+)−Smpl+(+−)}+{Smpl−(−+)−Smpl−(+−)}  formula (1)

Here, in formula (1), Smpl+(−+) is a positive sampled value when digital sampling values change from a negative (−) to a positive (+), Smpl+(+−) is a positive sampled value when sampled values change from a positive to a negative, Smpl−(−+) is a negative sampled value when sampled values change from a negative to a positive, and Smpl−(+−) is a negative sampled value when sampled values change from a positive to a negative.

The phase difference calculating unit 40 obtains phase difference by formula (1) by using this new value whenever newly taking two sampled values in, and updates a value of the phase difference in turn. This phase difference obtained is digital-analog converted by the D/A converter 50, and is integrated by the loop filter 60, this integrated signal becomes a control signal for the VCO 70, and by this control signal, an oscillation frequency of the VCO 70 is controlled at any time.

At this time, if the relation between the input analog signal in A/D converter 30 and the sampling clock from the VCO 70 is as shown in FIG. 11, phase difference by formula (1) becomes "zero", and hence sampling operation with the sampling clock is performed accurately.

On the other hand, if the relation between the input analog signal and sampling clock is as shown in FIG. 12, with obtaining phase difference by formula (1) by using sampled values in the drawing, the phase difference becomes a positive value as phase difference=(7−3)+(−3−(−7))=8, and hence the sample timing of the input analog signal is in a late condition. Thus, feedback operation that advances a phase of the sampling clock is performed.

In addition, if the relation between the input analog signal and sampling clock is as shown in FIG. 13, with obtaining phase difference by formula (1) by using sampled values in the drawing, the phase difference becomes a negative value as phase difference=(3−7)+(−7−(−3))=−8, and hence the sample timing of the input analog signal is in an advanced condition. Thus, feedback operation that delays a phase of the sampling clock is performed. If such a feedback control is performed, feedback is performed so that a value of phase difference in formula (1) finally becomes zero, thereby completing pulling-in operation, and performing locking operation.

By the way, as a conventional synchronization method that is different from the above-described one, for example, a method is proposed, the method generating a sampling clock so that edges of the sampling clock correspond to zero-cross points (points where a signal becomes zero) of the input analog signal shown in FIG. 11(a). Nevertheless, in this synchronization method, it becomes necessary to adopt an edge-pulling-in type PLL circuit instead of the PLL loop shown in FIG. 10, and to further use other circuit elements such as a delay element. This type of PLL circuit is called an analog type PLL, which cannot perform precise pulling-in operation if the phase pulling-in operation is necessary for data after digital conversion of a signal like a PRML (Partial Response Maximum Likelihood) method.

Furthermore, there is a method of providing two groups of PLL loops each including the A/D converter 50, loop filter 60 and VCO 70, which are shown in FIG. 10, for accelerating phase (including a frequency) pulling-in speed, one PLL loop of which has a gain that is as high as possible at the time of pulling-in, and another PLL loop of which has a gain that is set low for stabilizing the loop as much as possible after pulling-in.

However, in the conventional PLL circuits, false lock 10 explained below occurs, and hence the performance of the PLL circuits deteriorates remarkably.

What is shown in FIG. 14 is a case that a frequency of the input signal is a desired value but sampling points are not at desired positions and Smpl−(+−) and Smpl−(−+) correspond to the same sampling point, and hence the operation result of formula (1) becomes "zero", and the phase difference becomes "zero". In this case, a state of feedback control by a PLL loop unintentionally becomes stable at a state that the feedback control should not be essentially stable, and hence the false lock (the first false lock) occurs.

A situation which is the same as this will be explained more concretely with reference to FIG. 15. If sampling points of the input signal become as shown in FIG. 15, it is only judged in the conventional technology that sampling points are before or after zero cross, and sampled values are assigned to respective term of formula (1). Owing to this, the phase difference obtained by formula (1) from concrete numeric values shown in FIG. 15 (sampled values) is Phase difference=(C−A)+(B−B)=(2−2)+(−6−(−6))=0. In this manner, if the phase difference becomes "zero", feedback control by the PLL loop becomes not effective, and hence there is a possibility that the feedback control becomes stable in a wrong phase.

In addition, what is shown in FIG. 16 is false lock occurring when frequencies of the sampling clock from the VCO 70 are slower than a frequency of the input signal. FIG. 15(a) shows a case that an oscillation frequency ($f_{vco}$) of the VCO 70 synchronizes with the input signal and hence accurate sampling is performed. FIGS. 16(b) and 16(c) show cases that frequencies of sampling clocks from the VCO 70 are slower than the frequency of the input signal (two times slower than the usual in FIG. 16(b), and six times slower than the usual in FIG. 16(c).

In this case, for example, as shown in FIG. 16 (b), if digital sampling is performed at positive and negative peak positions of the input signal, Smpl−(+−) and Smpl−(−+) correspond to the same sampling point, the operation result of formula (1) becomes "0", and hence the phase difference becomes "zero". Therefore, also owing to this, the false lock (the second false lock) occurs.

By the way, there is also a case that an input signal to the A/D converter 30 has an offset, and in such a case, sampling points are shifted, there is a possibility of false lock occurring, and hence it is desirable to reduce the offset of the input signal as much as possible.

As described above, in order to prevent the occurrence of the false lock, it is necessary to provide a circuit to perform pulling-in operation by bringing an oscillation frequency of the VCO close to an expected frequency of the input signal till the pulling-in operation by the PLL loop is started, and a circuit to reduce the offset. Nevertheless, evils are conceivable, the evils which cause cost increase due to complexity of circuitry and deteriorate the capability of the entire system.

The present invention has been achieved in order to solve such conventional problems, and its first object is to provide a PLL circuit which can prevent the above-described false lock with simple configuration.

In addition, a second object of the present invention is to provide a PLL circuit that can not only prevent the above-described false lockwith simple configuration, but also reduce an offset of an input signal.

DISCLOSURE OF THE INVENTION

The present invention provides a PLL circuit including: an A/D converter for obtaining sampled values in turn by sampling an analog signal as well as synchronizing with a sampling clock; a phase difference detecting circuit for obtaining phase difference between the above-described analog signal and the above-described sampling clock on the basis of the above-described sampled values; a loop filter for integrating the above-described phase difference; and an voltage controlled oscillator for controlling the timing of the above-described sampling clock according to the above-described phase difference integrated, characterized in that the above-described phase difference detection circuit obtains the above-described phase difference according to a predetermined operational expression by using a predetermined number of sampled values, obtains a sign pattern of the above-described predetermined number of sampled values, and determines input values to the above-described operational equation according to this obtained sign pattern.

As an embodiment of a PLL circuit of the present invention, a PLL circuit can be cited, the PLL circuit characterized in that the above-described phase difference detecting circuit has a table that describes the relation between the above-described sign patterns and input values to the above-described operational equation, and determining input values to the above-described operational equation by referring to the above-described sign patterns and the above-described table.

As another embodiment of a PLL circuit of the present invention, a PLL circuit is cited, the PLL circuit being characterized in that the above-described phase difference detecting circuit comprises: a register for storing sampled values from the above-described A/D converter in turn; a code judging section that obtains a sign pattern of the predetermined number of sampled values stored in this register, and determines according to this sign pattern, which is obtained, whether processing contents are updated to redetermined sampled values as input values to the above-described operational equation or not updated; and a calculating section for obtaining the above-described phase difference according to the above-described operational equation on the basis of the determination of this code judging section.

As an embodiment of a PLL circuit of the present invention, a PLL circuit is cited, the PLL circuit being characterized in that the above-described predetermined number of sampled values is a predetermined number of newest sampled values and sampled values before that.

As an embodiment of a PLL circuit of the present invention, a PLL circuit is cited, the PLL circuit being characterized in that the above-described predetermined number of sampled values are four including a newest value, and a number of the above-described past sampled values is two lasting to the newest four.

As an embodiment of a PLL circuit of the present invention, a PLL circuit is cited, the PLL circuit being characterized in that the above-described phase difference detecting circuit comprises: a first register for storing sampled values from the above-described A/D converter in turn; a second register for storing a state corresponding to a sign pattern of sampled values stored in this first register; a code judging section for determining whether processing contents are to be updated in predetermined sampled values, stored in the above-described first register, as input values to the above-described operational equation according to a sign pattern of a predetermined number of newest sampled values stored in the above-described first register and the state stored in the above-described second register, or are not to be updated; and a calculating section for obtaining the above-described phase difference according to the above-described operational equation on the basis of the determination of this code judging section.

As an embodiment of a PLL circuit of the present invention, a PLL circuit is cited, the PLL circuit being characterized in that the state that is stored in the above-described second register is any one of a state that a sign pattern is normal, a state that the sign pattern is abnormal, and a state that the sign pattern is not fixed to any one of the above-described states.

As an embodiment of a PLL circuit of the present invention, a PLL circuit is cited, the PLL circuit being characterized in that the above-described analog signal has a 2T pattern, and an operational equation for obtaining the above-described phase difference is Phase difference={Smpl+(−+)−Smpl+(+−)}+{Smpl−(−+)−Smpl−(+−)} (where, Smpl+(−+) denotes a positive sampled value when a sign of a digital signal sampled changes from a negative sign to a positive sign, Smpl+(+−) denotes a positive sampled value when a sign of the digital signal sampled changes from a positive sign to a negative sign, Smpl−(−+) denotes a negative sampled value when a sign of the digital signal sampled changes from a negative sign to a positive sign, and Smpl−(+−) denotes a negative sampled value hen a sign of the digital signal sampled changes from a positive sign to a negative sign).

As an embodiment of a PLL circuit of the present invention, a PLL circuit is cited, the PLL circuit being characterized in that, if the above-described sign pattern is "+−+−" or "−+−+," the above-described code judging section does not perform the update processing of phase difference even if there is a change of signs of sampled values.

As an embodiment of a PLL circuit of the present invention, a PLL circuit is cited, the PLL circuit being characterized in that the above-described code judging section updates input values to the above-described operational equation to predetermined sampled values only when the above-described sign pattern is predetermined.

As an embodiment of a PLL circuit of the present invention, a PLL circuit is cited, the PLL circuit being characterized in that, if the above-described sign pattern is "++−−" or "−−++," furthermore "+−++" or "−+−−," that is regarded as a pattern similar to the concerned pattern, or moreover a pattern whose phase is shifted from this similar pattern, input values to the above-described operational equation are updated to predetermined sampled values even if there is not a sign change between two sampled values that are the newest.

In addition, the present invention provides a PLL circuit being characterized in that the PLL circuit comprises: any one of the above-described PLL circuits; offset detecting means for detecting an offset of the above-described analog signal by performing predetermined calculation for a plurality of sampled values outputted in turn from the above-described A/D converter; and offset canceling means for generating a signal canceling an offset detected by this offset detecting means and supplying this signal to an input side of the above-described A/D converter.

BRIEF DESCRIPTION OF THE DRAWINGS

FIG. 2 is a drawing showing an example of a table when a code process judging section performs processing;

FIG. 3 is drawings for explaining the operation of the first embodiment;

FIG. 4 is drawings for explaining another operation of the first embodiment;

FIG. 7 is a drawing showing an example of a table when a code process judging section performs processing;

BEST MODE FOR CARRYING OUT THE INVENTION

Hereinafter, embodiments of the present invention will be described with reference to drawings.

Figure 1:
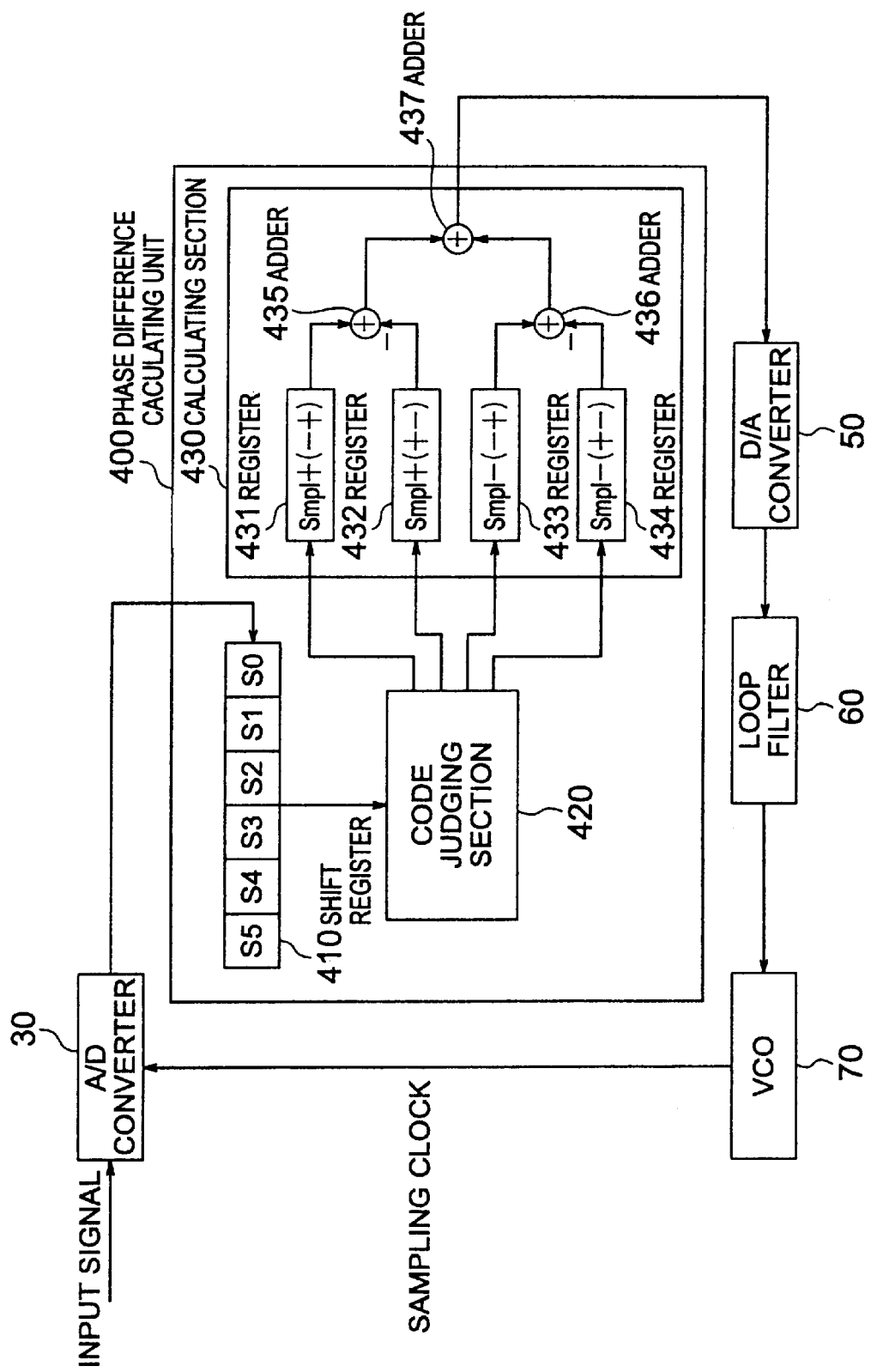
FIG. 1 is a block diagram showing the configuration of a PLL circuit according to a first embodiment of the present invention.

FIG. 1 is a block diagram showing the configuration of a PLL circuit according to a first embodiment of the present invention. This PLL circuit, as shown in FIG. 1, comprises: an A/D converter 30 that performs analog-digital conversion of an analog signal inputted, and performs digital sampling; a phase difference calculating unit 400 obtaining phase difference like later description on the basis of an output from this A/D converter 30; a D/A converter 50 performing digital-analog conversion of this phase difference obtained; a loop filter 60 integrating the phase difference digital-analog converted; and a VCO (Voltage Controlled Oscillator) 70 generating a sampling clock according to this integral value. The phase difference calculating unit 400, as described later, has a shift register 410, a code judging section 420, and a calculating section 430.

The A/D converter 30 is configured so that, when an analog signal is inputted, the A/D converter 30 obtains sampled values by sampling this analog signal in synchronization with the sampling clock from the VCO 70. This sampled value is composed of a plurality of bits, and has two types of information of largeness and a sign (positive or negative).

The shift register 410, as shown in FIG. 1, is composed of six storage elements S0 to S5 each holding (storing) each sampled value (sampling data) outputted from the A/D converter 30. Then, this shift register 410 is made to perform the shift operation of a sampled value each time the sampled value is sent from the A/D converter 30.

Here, the shift register 410 can be such a device that the device takes in every two sampling data in the S1 and S0 in turn and shifts the sampling data, having been already held, by two sampling data in turn. In this case, the shift register 410 performs shift operation every time two sampling codes are sent from the A/D converter 30 so that, for example, if two sampling data is taken in as the S1 and S0 in some timing, the sampling data which has been already held in the S3 and S2 is shifted to the S5 and S4, and the sampling data which has been already held in the S1 and S0 is shifted to the S3 and S2.

The calculating section 430 has a register 431 holding a value of Smpl+(−+), a register 432 holding a value of Smpl+(+−), an adder 435 adding a value, which is obtained by attaching a negative sign to a value held by the register 432, to a value held by the register 431 (performing subtraction), a register 433 holding a value of Smpl−(−+), a register 434 holding a value of Smpl−(+−), an adder 436 adding a value, which is obtained by attaching a negative sign to a value held by the register 434, to a value held by the register 433 (performing subtraction), and an adder 437 adding respective addition results of the adder 435 and adder 436.

Since the adder 435 adds a value, which is obtained by attaching a negative sign to a value held by the register 432, to a value held by the register 431, the adder 436 adds a value, which is obtained by attaching a negative sign to a value held by the register 434, to a value held by the register 433, and further the adder 437 adds and outputs respective addition results of the adder 435 and adder 436, a value obtained from "{Smpl+(−+)−Smpl+(+−)}+{Smpl−(−+)−Smpl−(+−)}" is obtained as the phase difference, and is sent to the D/A converter 50.

The code judging section 420 obtains a sign pattern, which is composed of positive and negative signs (time series sign pattern shown in FIG. 4(*b*)), of the sampled values that are held in the storage elements S0 to S5 of the shift register 410, and performs processing of storing the sampled values held in the storage elements S0 to S3 of the shift register 410 in the predetermined registers 431 to 434 according to the obtained sign pattern.

In other words, this code judging section 420 obtains he above-described sign pattern each time the shift register 10 takes in two sampled values, and performs processing of assigning the sampled values held in the storage elements S0 to S3 of the shift register 410 to the registers 431 to 434 according to the obtained sign pattern. Here, when the code judging section 420 performs processing, contents of the storage elements S0 to S3 of the shift register 410 become the newest sampled values, and the sampled values of the storage elements S4 and S5 become past sampled values.

In addition, the processing of the code judging section 420 can be performed each time the shift register 410 takes in one sampled value, and in this case, high-speed processing is possible.

FIG. 2 is an example of a table for the above-described code judging section 420 performing the above-described processing, and describes relation between the sign pattern of digital values, held in the storage elements S5 to S0 of the register 410 (* in the drawing means that any sign can be used), and the processing contents.

For example, as denoted by reference symbol A1 in FIG. 2, if a sign pattern of digital values held in the storage elements S5 to S0 is "*++−++", the code judging section 420 not only stores a sampled value in the storage element S1 in the register 433, but also stores a sampled value in the storage element S0 in the register 431.

On the other hand, as denoted by reference symbol B1 in FIG. 2, if a sign pattern of digital values held in the storage elements S5 to S0 is "+−+−", the code judging section 420 does not update values of the registers 431 to 434, and hence phase difference obtained in the calculating section 430** is not updated (this is shown by "−" in the column of processing contents in the drawing).

When the phase difference is obtained by the calculating section 430, this is digital-analog converted by the D/A converter 50, this value digital-analog converted is integrated by the loop filter 60, and furthermore, the VCO 70 supplies a sampling clock with a frequency corresponding to this integral value to the A/D converter 30 and performs usual PLL operation.

According to this first embodiment, it becomes possible to prevent the occurrence of the first and second false lock that are described above by performing processing for sign patterns of the sampled values that are shown by reference symbols A1 to A6, and B1 to B4 in FIG. 2. Hereinafter, this reason will be explained.

Figure 14:
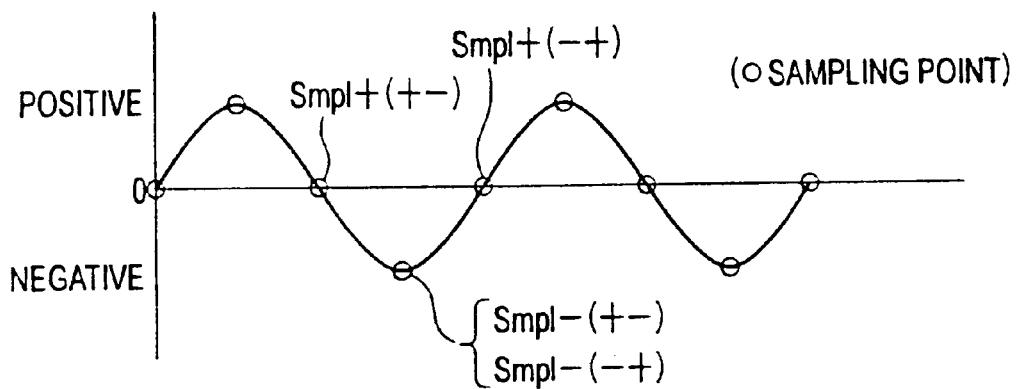
FIG. 14 is an explanatory diagram of a problem (the first false lock) of a conventional technology.

The first false lock shown in FIG. 14 is a case that phase difference becomes "zero" and unintentionally becomes stable when synchronization with an waveform of a frequency that is four times the sampling period is performed. This waveform is a leading part of a waveform read from an MO disk (Magneto-Optical disk), and is called a "2T pattern."

If variations of signs are "++−−", "−−++", "−++−", and "+−−+", it is possible to perform the pulling-in operation so long as only a newest input sign is considered, but if the variations of signs are repeatedly "+−++", "−+−−", "−+++", and "+−−−", Smpl−(+−) and Smpl−(−+) (or, Smpl+(+−) and Smpl+(−+)) become the same value when phase difference calculation is performed with a conventional way, and in consequence, the phase difference occasionally becomes "zero" and the false lock may occur.

Thus, the phase difference becomes "{Smpl+(+−)−Smpl+(−+)}+{Smpl−(−+)−Smpl−(+−)}={Smpl+(+−)−Smpl+(−+)}", and in case of Smpl+(+−)=Smpl+(−+), the phase difference becomes "zero" and the false lock occurs.

On the other hand, according to this first embodiment, by considering patterns of past sign changes in addition to signs of the newest sampled values, it becomes possible to pull in a known pattern with estimating that the known pattern is inputted.

A schematically explained diagram in FIG. 3 shows a case of corresponding to the symbol A1 in FIG. 2, the phase difference is calculated so that a feedback loop functions so that sampling points are shifted in the direction shown by an arrow, and concretely, the phase difference becomes "{Smpl+(+−)−Smpl+(−+)}+{Smpl−(−+)−Smpl−(+−)}=(S3−S0)+(S1−S2)".

In this manner, in regard to what are denoted by symbols A1 to A6 in FIG. 2, according to a conventional method, phase difference is not updated by using these two sampled values since there is no sign change between two newest sampled values, but according to the first embodiment, it is possible to prevent the occurrence of the first false lock since the phase difference is updated in consideration of patterns before the newest samples. In addition, since it is possible to automatically take in from a sign pattern into a known pattern and it is not necessary to instruct the start and stop of the 2T pattern from the external, it is also possible to miniaturize the circuit itself.

Figure 15:
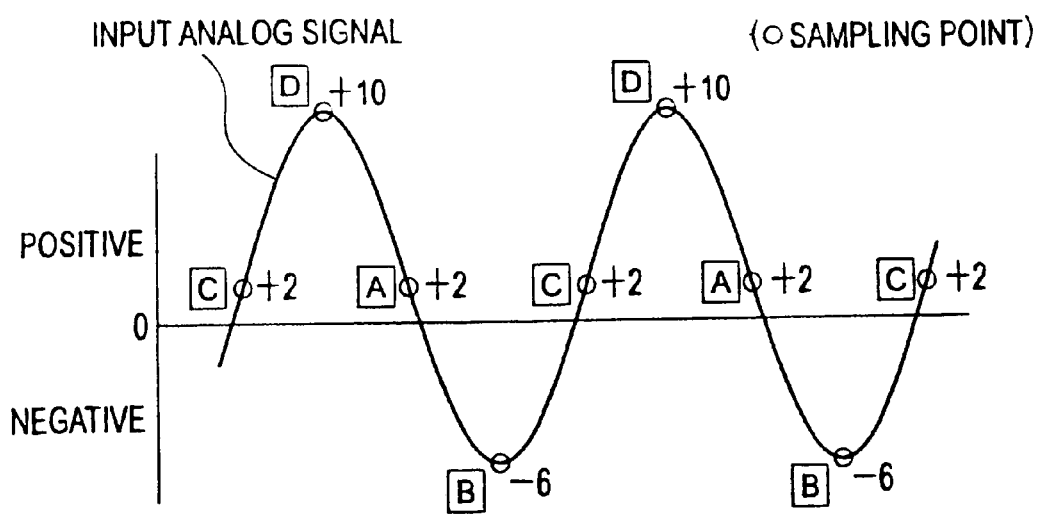
FIG. 15 is an explanatory diagram of a problem of the conventional technology.

Next, a similar example will be explained by using FIGS. 4, 5, and 15, and concrete numeric values.

Now, assuming that sampling points of an input signal are those as shown in FIG. 4, according to a conventional method, phase difference becomes "zero" because of the above-described reason. Numeric values in FIG. 4 are concrete sampled values of sampling points.

Figure 5:
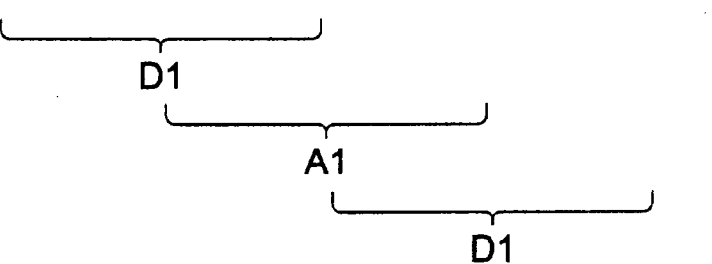
FIG. 5 is drawings for explaining processing contents for a sign pattern in FIG. 4.
Figure 5:
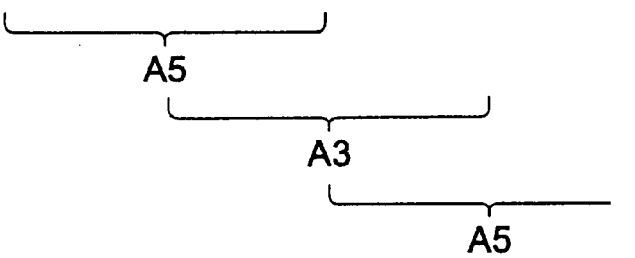

Nevertheless, according to the first embodiment, since the processing following FIG. 2 is performed and this processing is performed each time two sampled values in the shift register 410 are updated, in the case of FIG. 4, there are two cases of a case shown in FIG. 5(*a*) and a case of a phase which is shifted from that as shown in FIG. 5(*b*).

In addition, if, for example, a sign pattern of sampled values in the storage elements S3 to S0 of the shift register 410 is "+++−", as shown in FIG. 5(*a*), the processing contents in FIG. 2 become what is shown by symbol D1 in the drawing. In addition, if a sign pattern is "++−+", as shown in FIG. 5(*b*), the processing contents in FIG. 2 become what is shown by symbol A5 in the drawing.

In this manner, even if it is any one of the processing contents corresponding to sign patterns shown in FIGS. 5(a) and 5(b), phase difference=(D−A)+(C−B)=8+8=16 holds with calculating the phase difference by using sampled values in the drawing.

In this manner, according to the first embodiment, feedback control correctly works in a PLL loop without phase difference becoming "zero" and stable like the conventional method.

Figure 16A:
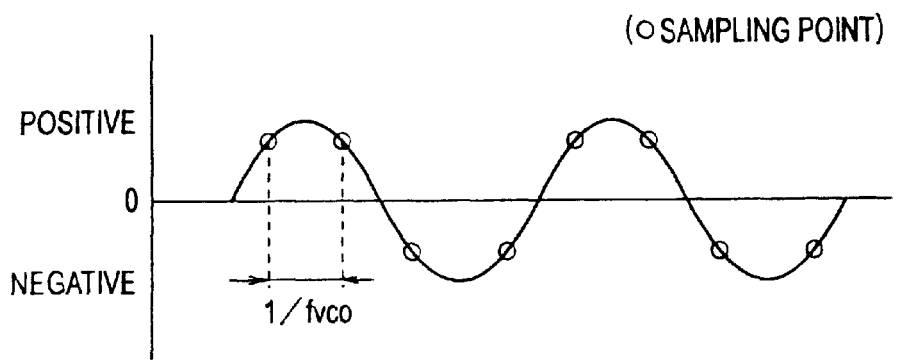
FIG. 16 is explanatory diagrams of problems (the second false lock) of the conventional technology.
Figure 16B:
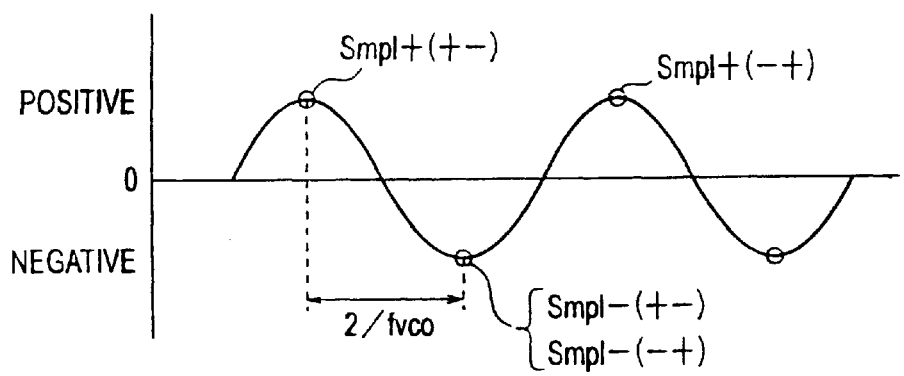
Figure 16C:
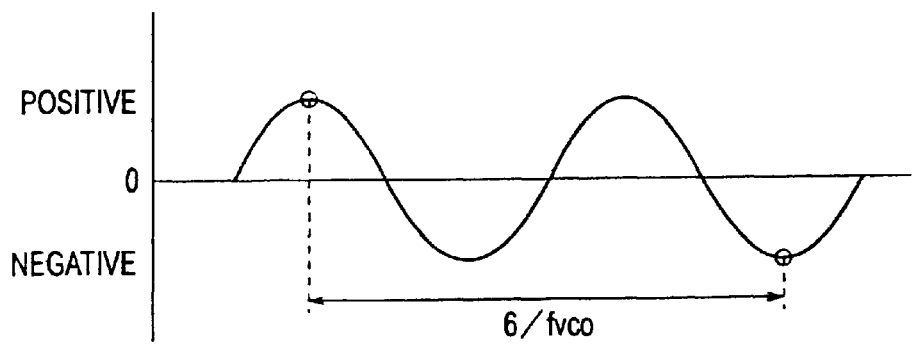

In addition, the above-described second false lock explained by using FIG. 16 is a case that a clock frequency of the VCO that has been stable drastically changes, or a case that sign changes of "+−" are repeated because the VCO operates in a low frequency at the startup of the VCO, and in the first embodiment, it is judged that such a sign pattern is abnormal. Its reason is that, since the above-mentioned 2T pattern is a highest frequency pattern actually inputted, such a sign pattern as "+−+−" or "−+−+" can never exist.

Then, in the first embodiment, if an abnormal pattern like "+−+−" or "−+−+", or a pattern similar to the abnormal ones is detected, the PLL loop is operated by using values of phase difference up to then without calculating phase difference by using the sampled values.

Such an abnormal pattern or a pattern similar to this is shown by symbols B1 to B4 in FIG. 2, and because the updating of phase difference is not performed in the case of such a sign pattern, the occurrence of the second false lock can be prevented.

As described above, according to the first embodiment of this invention, it is possible to realize a PLL circuit that can prevent the false lock from conventionally occurring with simple configuration.

Next, a PLL circuit according to a second embodiment of the present invention will be explained with reference to FIG. 6. In this second embodiment, since parts having the same symbols as those in the first embodiment in FIG. 1 have the same configuration, hereinafter, regarding the same parts, their description will be adequately omitted, and different parts will be explained in detail.

Figure 6:
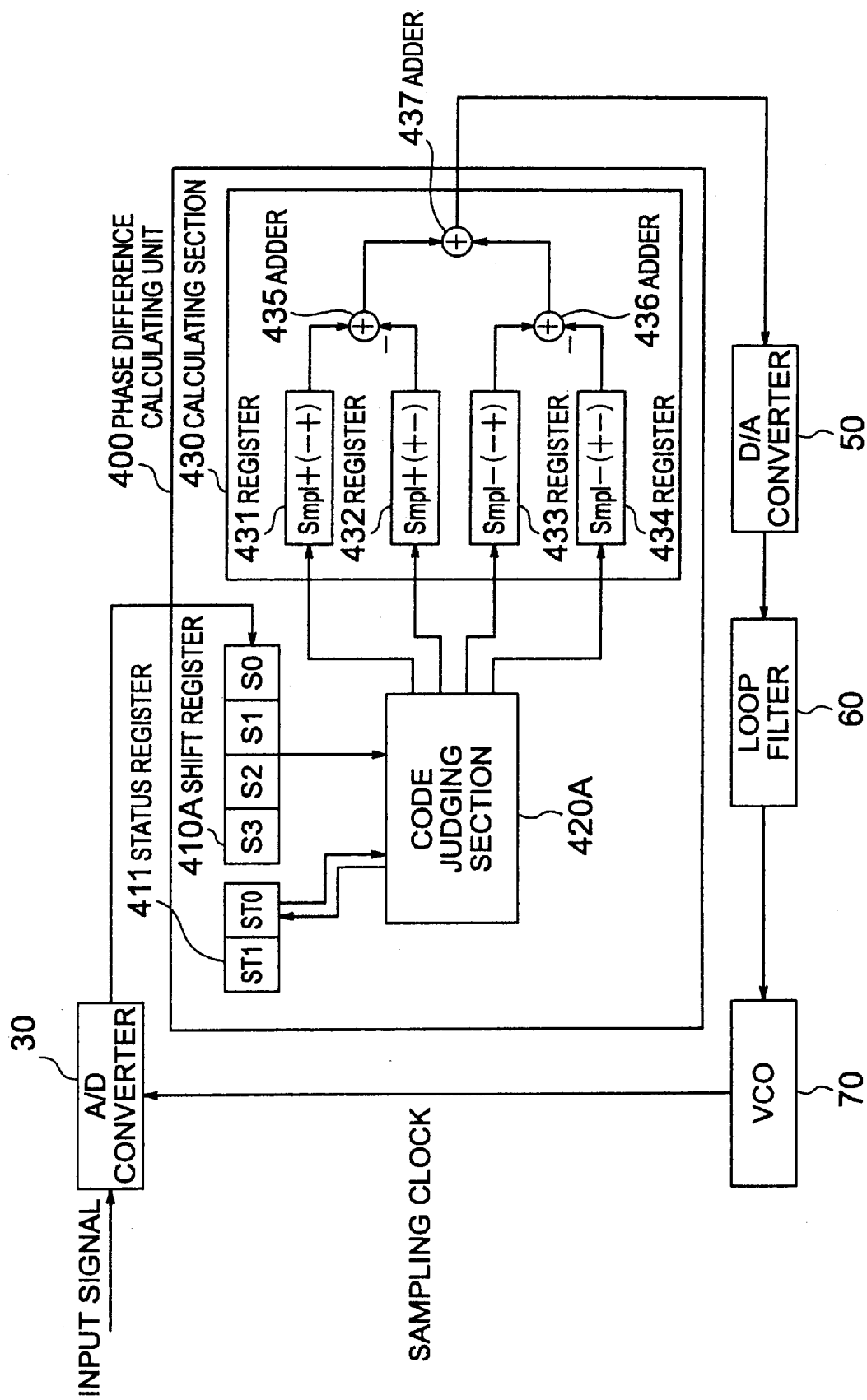
FIG. 6 is a block diagram showing the configuration of a PLL circuit according to a second embodiment of the present invention.

A PLL circuit according to this second embodiment, as shown in FIG. 6, comprises: a shift register 410A storing sampled values from an A/D converter 30 in turn; a status register 411 storing a state according to a sign pattern of sampled values stored in this shift register 410A; and a code judging section 420A performing the processing of storing sampled values, held in storage elements S0 to S3 of the shift register 410A, in predetermined register 431 to 434 according to a sign pattern of sampled values stored in storage elements S0 to S3 of the shift register 410A and a state stored in the status register 411.

A state stored in the status register 411 is any one of a state that a sign pattern of past sampled values, stored in the shift register 410A when the code judging section 420A performed processing last time, is normal (Valid), a state that the sign pattern is abnormal(Cancel), and a state that the sign pattern is not determined as any one of the above (Unknown). If "00", "01", and "10" are set in the status register 411, they correspond to "Valid", "Unknown", and "Cancel" respectively.

In this second embodiment, not only the shift register 410A consists of four storage elements S0 to S3, but also the code judging section 420A performs the reference to the status register 411 and the setting of data to the register 411.

The code judging section 420A obtains a time-serial sign pattern of sampled values, stored in the storage elements S0 to S3 of the shift register 410A, each time the shift register 410A takes in two sampled values, and performs processing of assigning the sampled values, held in the storage elements S0 to S3 of the shift register 410A, according to this sign pattern, which is obtained, and a state, stored in the status register 411, to the registers 431 to 434.

FIG. 7 is an example of a table for this code processing judging section 420A performing the above-described processing, and describes the relation between the state held in the status register 411 and sign pattern of digital values held in the storage elements S3 to S0 of the register 410A (* in the drawing means that any sign can be used), and the processing contents.

For example, as shown by a symbol C1 in the drawing, if contents held in the status register 411 are "00" and a sign pattern of sample values in the storage elements S3 to S0 of the shift register 410A is "+−++", the code judging section 420A not only stores a value in the storage element S1 in the register 433, but also stores the value in the storage element S0 in the register 431, and further sets "00 (Valid)" in the status register 411.

On the other hand, as shown by symbol C2 in FIG. 7, if contents held in the status register 411 are "01" and a sign pattern of sampled values in the storage element S3 to S0 is "−+−−", the code judging section 420A does not perform the updating of values in the registers 431 to 434, and hence the phase difference obtained in the calculating section 430 is not updated (this is shown by "−" in the processing contents column in the drawing). At this time, the code judging section 420A sets "00 (Valid)" in the status register 411.

In this manner, when the phase difference is obtained, this is digital-analog converted by the D/A converter 50, this value digital-analog converted is integrated by the loop filter 60, and furthermore, the VCO 70 supplies a sampling clock with a frequency corresponding to this integral value to the A/D converter 30 and performs usual PLL operation.

As described above, according to the second embodiment of the present invention, since PLL control operation is performed in consideration of a sign pattern of current sampled values and a state of a sign pattern of the sampled values used when the code judging section 420A obtains phase difference last time, similarly to the first embodiment, the occurrence of the false lock can be prevented.

Next, a PLL circuit according to a third embodiment of the present invention will be explained with reference to FIG. 8.

A PLL circuit according to in this third embodiment, includes: a PLL circuit according to the first embodiment shown in FIG. 1; and furthermore means for detecting an offset of an input signal in the A/D converter 30, generating a signal canceling this offset detected, and canceling the offset of the input signal by the signal.

Therefore, since this third embodiment has parts common to the first embodiment, the same symbols will be assigned to the common parts, their description will be omitted appropriately, and parts, whose configuration is different, according to detection and cancellation of the offset will be described in detail below.

This third embodiment obtains an offset of an input signal in the A/D converter 30 by a next formula (2).

$$\text{Offset}=\text{Smpl}+(-+)+\text{Smpl}+(+-)+\text{Smpl}-(-+)+\text{Smpl}-(+-) \quad \text{formula (2)}$$

Here, meaning of each term in the formula (2) is similar to each in the formula (1).

Figure 8:
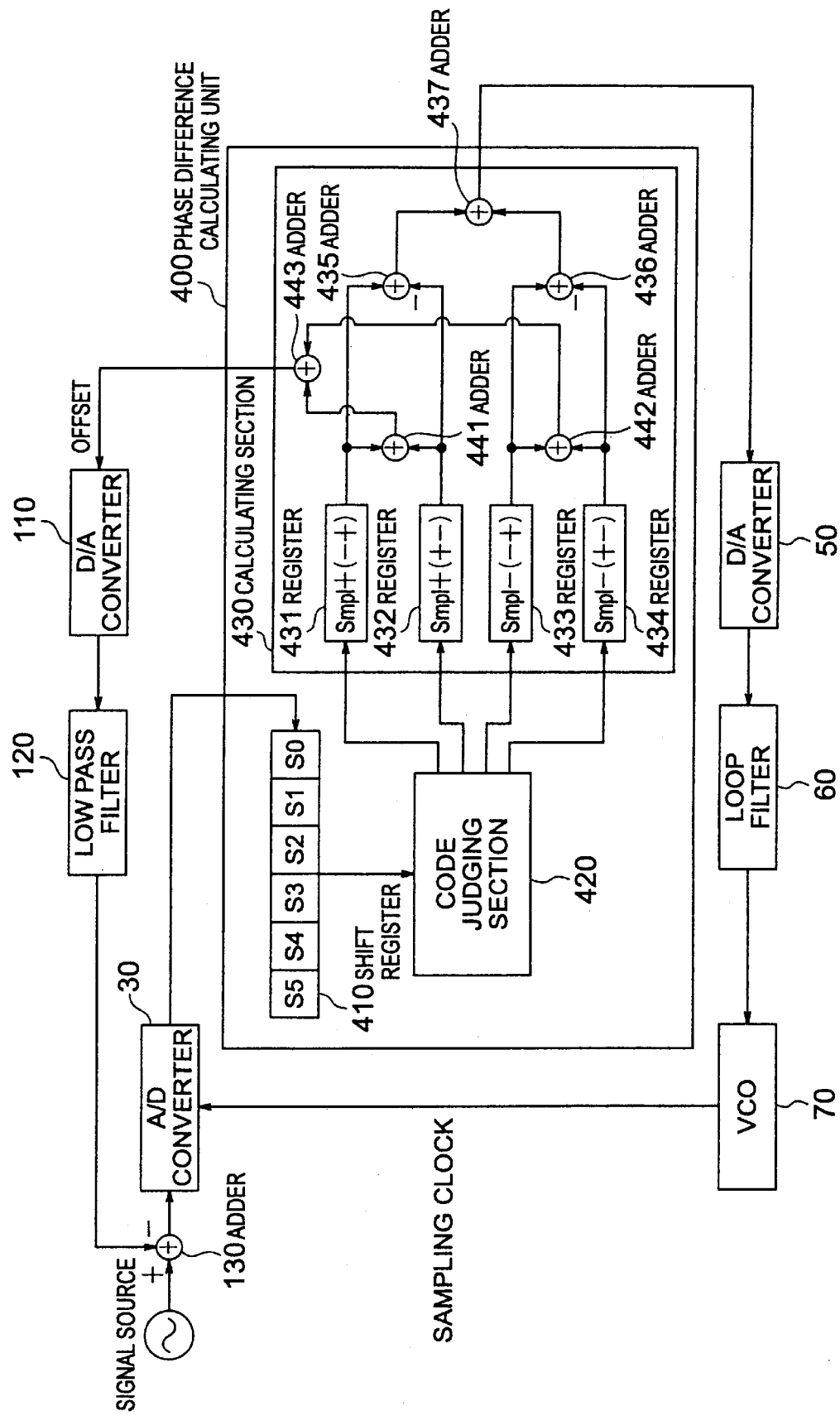
FIG. 8 is a block diagram showing the configuration of a PLL circuit according to a third embodiment of the present invention.

In order to obtain the offset by this formula (2), in this third embodiment, as shown in FIG. 8, a calculating unit 430A includes: an adder 441 adding a value in the register 431 storing Smpl+(−+) to a value in the register 432 storing Smpl+(+−); an adder 442 adding a value in the register 433 storing Smpl−(−+) to a value in the register 434 storing Smpl−(+−); and an adder 443 adding an addition result of the adder 441 to an addition result of the adder 442. Furthermore, the offset in a digital form that is obtained from the adder 443 is digital-analog converted by the D/A converter 110 to be converted into an analog signal, and this signal is smoothed by the low pass filter 120 to be fed back to the adder 130 and is added to an input signal in the adder 130.

Next, the operation of the PLL circuit according to the third embodiment having such configuration will be explained.

Figure 9A:
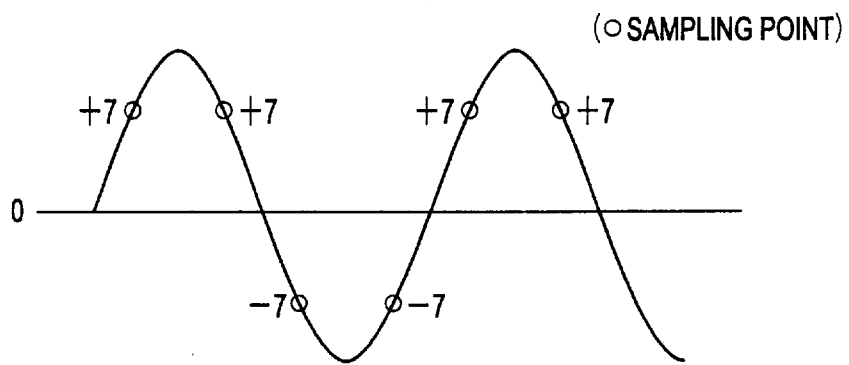
FIG. 9 is wave form charts for explaining the operation of the third embodiment.

Now, if the relation between the input signal in the A/D converter 30 and the sampling points is as shown in FIG. 9(a), by obtaining an offset by formula (2) by using sample values in the drawing, (7+7+(−7)+(−7))=0.

Figure 9B:
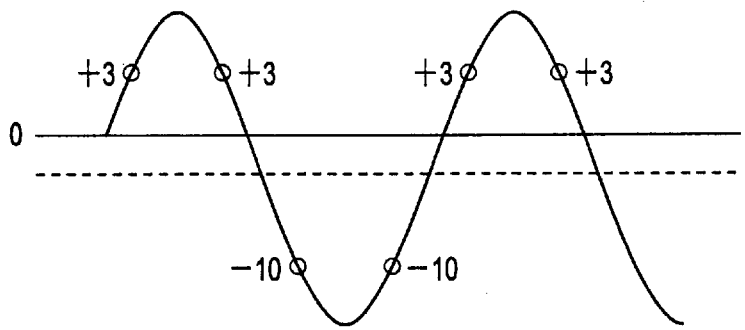

Next, if the input signal in the A/D converter 30 has an offset and the relation between the input signal in the A/D converter 30 and the sampling points is as shown in FIG. 9(b), by obtaining an offset by using sampled values in the drawing, (3+3+(−10)+(−10))=−14. At this time, because the current input signal is shifted in the negative direction, it is necessary to lift it in the positive direction. Then, the offset obtained is fed back to the adder 130 through the D/A converter 110 and low pass filter 120, and owing to this, it is possible to reduce the offset of the current input signal.

Figure 9C:
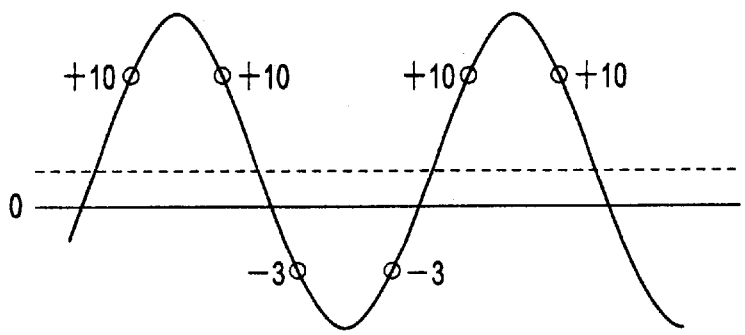
Figure 10:
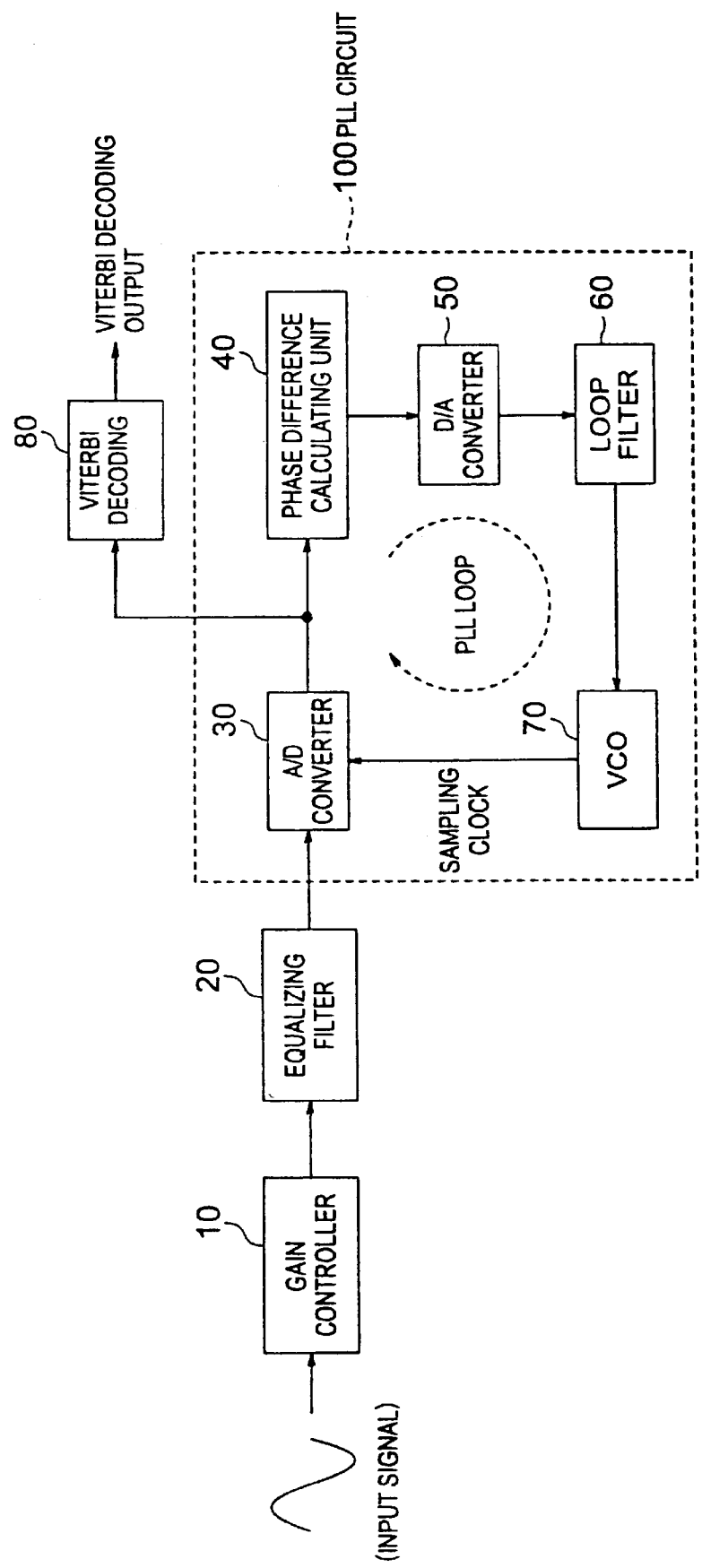
FIG. 10 is a block diagram of a conventional PLL circuit.
Figure 11A:
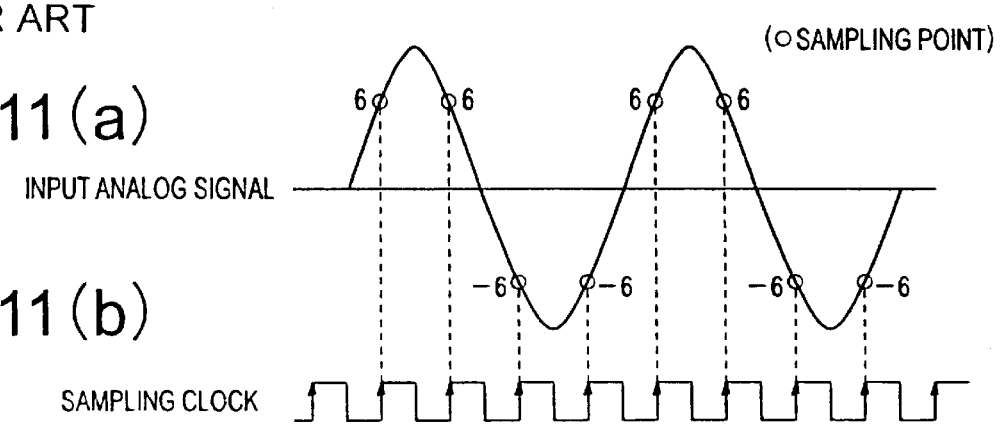
FIG. 11 is wave form charts for explaining the operation of the PLL circuit.
Figure 12A:
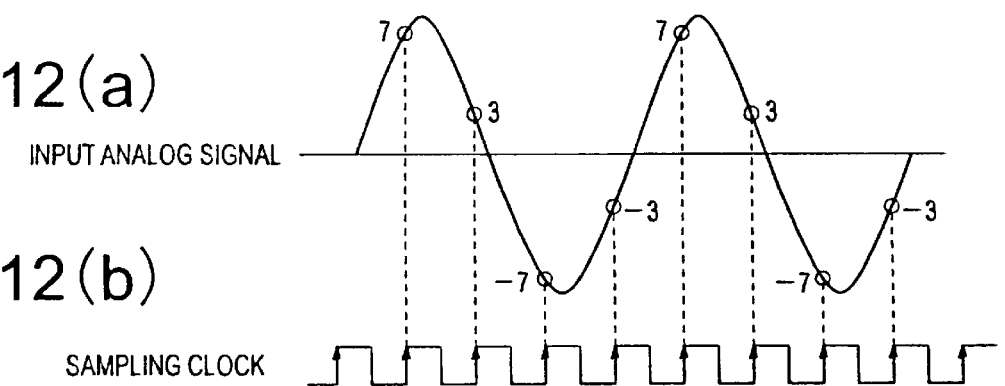
FIG. 12 is wave form charts similarly.
Figure 13A:
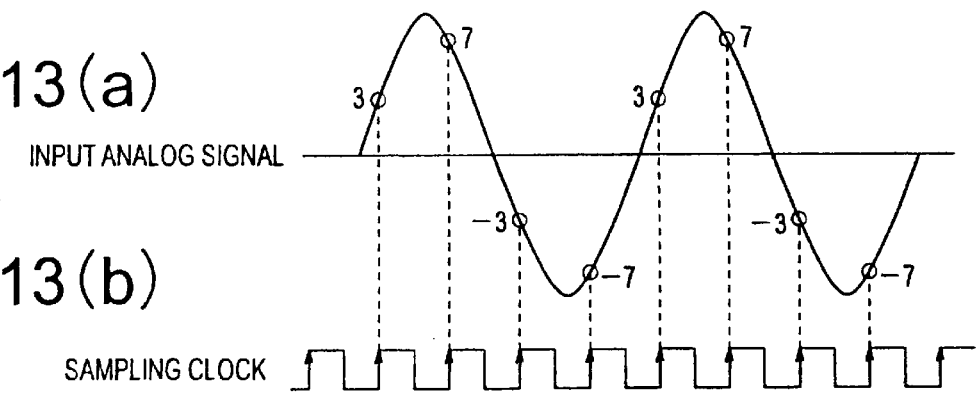
FIG. 13 is wave form charts similarly.

Furthermore, if the input signal in the A/D converter 30 has an offset and the relation between the input signal in the A/D converter 30 and the sampling points is as shown in FIG. 9(c), by obtaining an offset by using sampled values in the drawing, (10+10+(−3)+(−3))=+14. At this time, because the current input signal is shifted in the positive direction, it is necessary to lower it in the negative direction. Then, the offset obtained is fed back to the adder 130 through the D/A converter 110 and low pass filter 120, and hence it is possible to reduce the offset of the current input signal.

Above description, as apparent from FIG. 9, is a case that phase difference between an input signal in the A/D converter 30 and a sampling clock in the VCO 70 is "zero". Nevertheless, even if an input signal and its sampling points are as shown in FIG. 4(a), this third embodiment can surely obtain an offset of the input signal and can perform the operation that can reduce this offset obtained.

Thus, by calculating an offset in this case by using sampled values in FIG. 4(a), offset=D+A+C+B=10+2+2−6=8, and hence feedback control acts correctly in a direction of lowering the current input signal to the negative direction.

As described above, in the third embodiment, since means for detecting an offset of an input signal in the A/D converter 30, generating a signal canceling this offset detected, and canceling the offset of the input signal by the signal is provided, it is possible not only to prevent the false lock, but also to reduce the offset of the input signal.

In addition, the third embodiment includes means for reducing an offset of the input signal as the above in addition to the first embodiment. Nevertheless, it is also possible to provide the means in the second embodiment, in this case, the embodiment operates similarly to the third embodiment, and it is possible to obtain similar operation and effects.

In addition, although, in the third embodiment, an offset is obtained by using three adders 441 to 443, it can be performed to obtain the offset by one adder. Furthermore, the third embodiment has the configuration of feeding back an offset from the adder 443 to the adder 130 through the D/A converter 110 and low pass filter 120. Nevertheless, instead of this, it can be also performed to arrange the low pass filter 120 configured by a digital filter in an input side of the D/A converter 110, and to supply an output of this D/A converter 110 to the adder 130. In addition, it can be performed to omit the D/A converter 110, low pass filter 120, and adder 130, and to directly cancel the offset included in sampling data outputted from the A/D converter 30 by using an output of the above-described digital filter.

INDUSTRIAL APPLICABILITY

As described above, according to the present invention, a sign pattern of sampled values of an input signal is obtained and input values to an operational equation for obtaining phase difference are decided according to this obtained sign pattern. Therefore, it is possible to provide a PLL circuit, which can accurately detect the phase difference, in simple configuration.

In addition, according to the present invention, an offset of an input signal is detected, a signal canceling this detected offset is generated, and the offset of the input signal is cancelled by the signal. Therefore, it is possible not only to accurately detect the phase difference, but also to reduce the offset of the input signal.

What is claimed is:

1. A PLL circuit, comprising:
   an A/D converter for obtaining sampled values in turn by sampling an analog signal as well as synchronizing with a sampling clock;
   a phase difference detecting circuit for obtaining phase difference between said analog signal and said sampling clock on the basis of said sampled values received from the A/D converter;
   a loop filter for integrating said phase difference; and
   a voltage controlled oscillator for controlling the timing of said sampling clock according to said phase difference integrated,
   wherein said phase difference detection circuit obtains said phase difference according to a predetermined operational equation by using a predetermined number of sampled values, obtains a sign pattern of said predetermined number of sampled values, and determines input values to said operational equation according to this obtained sign pattern; and
   wherein said phase difference detecting circuit has a table that describes the relation between said sign patterns and input values to said operational equation, and determines input values to said operational equation by referring to said sign patterns and said table.

2. The PLL circuit according to claim 1, wherein said phase difference detecting circuit comprises:
   a register for storing sampled values from said A/D converter in turn;
   a code judging section that obtains a sign pattern of the predetermined number of sampled values stored in the register, and determines according to this sign pattern, which is obtained, whether processing contents are updated to predetermined sampled values as input values to said operational equation or not updated; and
   a calculating section for obtaining said phase difference according to said operational equation on the basis of the determination of the code judging section.

3. The PLL circuit according to claim 1, wherein said predetermined number of sampled values is composed of a predetermined number of newest sampled values and a predetermined number of prior sampled values.

4. The PLL circuit according to claim 3, wherein said predetermined number of sampled values is four including a newest value, and said predetermined number of prior sampled values is two.

5. The PLL circuit according to claim 1, wherein said phase difference detecting circuit comprises:
a first register for storing sampled values from said A/D converter in turn;
a second register for storing a state corresponding to a sign pattern of sampled values stored in the first register;
a code judging section for determining whether processing contents are to be updated in predetermined sampled values, stored in said first register, as input values to said operational equation according to a sign pattern of a predetermined number of newest sampled values stored in said first register and the state stored in said second register, or whether processing contents are not to be updated; and
a calculating section for obtaining said phase difference according to said operational equation on the basis of the determination of the code judging section.

6. The PLL circuit according to claim 5, wherein a state that is stored in said second register is any one of a state that the sign pattern is normal, a state that the sign pattern is abnormal, and a state that the sign pattern is not fixed to any one of the above-described states.

7. The PLL circuit according to claim 1, wherein said analog signal has a 2T pattern, and an operational equation for obtaining said phase difference is as follows:

Phase difference={Smpl+(−+)−Smpl+(+−)}+{Smpl−(−+)−Smpl−(+−)}

(where, Smpl+(−+) denotes a positive sampled value when a sign of a digital signal sampled changes from a negative sign to a positive sign, Smpl+(+−) denotes a positive sampled value when a sign of the digital signal sampled changes from a positive sign to a negative sign, Smpl−(−+) denotes a negative sampled value when a sign of the digital signal sampled changes from a negative sign to a positive sign, and Smpl−(+−) denotes a negative sampled value when a sign of the digital signal sampled changes from a positive sign to a negative sign).

8. The PLL circuit according to claim 2 or 5, wherein, if said sign pattern is "+−+−" or "−+−+", said code judging section does not perform update processing of phase difference even if there is a change of signs of sampled values.

9. The PLL circuit according to claim 2 or 5, wherein said code judging section updates input values to said operational equation to predetermined sampled values only when said sign pattern is predetermined.

10. The PLL circuit according to claim 9, wherein, if said sign pattern is "++−−" or "−−++", furthermore "+−++" or "−+−−", that is regarded as a pattern similar to the concerned pattern, or moreover a pattern whose phase is shifted from this similar pattern, input values to said operational equation are updated to predetermined sampled values even if there is not a sign change between two sampled values that are the newest.

11. A PLL circuit comprising:
the PLL circuit according to claim 1;
offset detecting means for detecting an offset of said analog signal by performing predetermined calculation for a plurality of sampled values outputted in turn from said A/D converter; and
offset canceling means for generating a signal canceling an offset detected by the offset detecting means and supplying this signal to an input side of said A/D converter.

12. A PLL circuit, comprising:
an A/D converter for obtaining sampled values in turn by sampling an analog signal as well as synchronizing with a sampling clock;
a phase difference detecting circuit for obtaining phase difference between said analog signal and said sampling clock on the basis of said sampled values received from the A/D converter;
a loop filter for integrating said phase difference; and
a voltage controlled oscillator for controlling the timing of said sampling clock according to said phase difference integrated,
wherein said phase difference detection circuit obtains said phase difference according to a predetermined operational equation by using a predetermined number of sampled values, obtains a sign pattern of said predetermined number of sampled values, and determines input values to said operational equation according to this obtained sign pattern; and
wherein said phase difference detecting circuit comprises a register for storing sampled values from said A/D converter in turn;
a code judging section that obtains a sign pattern of the predetermined number of sampled values stored in the register, and determines according to this sign pattern, which is obtained, whether processing contents are updated to predetermined sampled values as input values to said operational equation or not updated; and
a calculating section for obtaining said phase difference according to said operational equation on the basis of the determination of the code judging section.

13. A PLL circuit, comprising:
an A/D converter for obtaining sampled values in turn by sampling an analog signal as well as synchronizing with a sampling clock;
a phase difference detecting circuit for obtaining phase difference between said analog signal and said sampling clock on the basis of said sampled values received from the A/D converter;
a loop filter for integrating said phase difference; and
a voltage controlled oscillator for controlling the timing of said sampling clock according to said phase difference integrated,
wherein said phase difference detection circuit obtains said phase difference according to a predetermined operational equation by using a predetermined number of sampled values, obtains a sign pattern of said predetermined number of sampled values, and determines input values to said operational equation according to this obtained sign pattern; and
wherein said phase difference detecting circuit comprises a first register for storing sampled values from said A/D converter in turn;
a second register for storing a state corresponding to a sign pattern of sampled values stored in the first register;

a code judging section for determining whether processing contents are to be updated in predetermined sampled values, stored in said first register, as input values to said operational equation according to a sign pattern of a predetermined number of newest sampled values stored in said first register and the state stored in said second register, or whether processing contents are not to be updated; and a calculating section for obtaining said phase difference according to said operational equation on the basis of the determination of the code judging section.

14. A PLL circuit, comprising:

an A/D converter for obtaining sampled values in turn by sampling an analog signal as well as synchronizing with a sampling clock;

a phase difference detecting circuit for obtaining phase difference between said analog signal and said sampling clock on the basis of said sampled values received from the A/D converter;

a loop filter for integrating said phase difference; and a voltage controlled oscillator for controlling the timing of said sampling clock according to said phase difference integrated, wherein said phase difference detection circuit obtains said phase difference according to a predetermined operational equation by using a predetermined number of sampled values, obtains a sign pattern of said predetermined number of sampled values, and determines input values to said operational equation according to this obtained sign pattern;

offset detecting means for detecting an offset of said analog signal by performing predetermined calculation for a plurality of sampled values outputted in turn from said A/D converter; and offset canceling means for generating a signal canceling an offset detected by this offset detecting means and supplying this signal to an input side of said A/D converter.

* * * * *